United States Patent [19]
Tailliet

[11] Patent Number: 5,801,577
[45] Date of Patent: Sep. 1, 1998

[54] HIGH VOLTAGE GENERATOR

[75] Inventor: François Tailliet, Le Tholonet, France

[73] Assignee: SGS-Thomson Microelectronics S.A., Saint Genis, France

[21] Appl. No.: 762,677

[22] Filed: Dec. 11, 1996

[30] Foreign Application Priority Data

Dec. 26, 1995 [FR] France .................... 95 15501

[51] Int. Cl.$^6$ .................................... G05F 1/10
[52] U.S. Cl. .................... 327/536; 307/110; 327/548
[58] Field of Search .................... 307/110; 327/530, 327/534, 535, 536, 537, 545, 546, 548

[56] References Cited

U.S. PATENT DOCUMENTS

| | | | |
|---|---|---|---|
| 3,824,447 | 7/1974 | Kuwabara | 321/15 |
| 4,398,099 | 8/1983 | Benoit-Gonin et al. | 307/246 |
| 5,043,858 | 8/1991 | Watanabe | 327/536 |
| 5,097,226 | 3/1992 | Pascucci et al. | 331/46 |
| 5,589,793 | 12/1996 | Kassapian | 327/536 |
| 5,592,115 | 1/1997 | Kassapian | 327/536 |

FOREIGN PATENT DOCUMENTS

A-0 591 022  4/1994  European Pat. Off.  ........ H02M 3/07

*Primary Examiner*—Timothy P. Callahan
*Assistant Examiner*—Jeffrey Zweizig
*Attorney, Agent, or Firm*—Wolf, Greenfield & Sacks, P.C.

[57] ABSTRACT

A circuit including a network of capacitors and switching transistors having two modes of functioning. The first mode isolates all the capacitors and simultaneously charges them to the level of the supply voltage. The second mode connects all these capacitors in series between the supply voltage Vdd and an output node of the network in order to instantaneously increase the voltage level of this output node to a voltage level that is greater than the supply voltage Vdd. The capacitors are all connected in series by transistors that are placed between them and controlled by a signal that has a peak voltage that is greater than the voltage to be switched to the output node of the network.

43 Claims, 7 Drawing Sheets

FIG_1

FIG_2

FIG_3

FIG_4

FIG_5

FIG_6

FIG_7

FIG_8a  FIG_8b  FIG_8c  FIG_8d  FIG_8e

HIGH VOLTAGE GENERATOR

BACKGROUND OF THE INVENTION

1. Field of the Invention

The present invention concerns a method and circuit for generating a high voltage that has an amplitude greater than the supply voltage. This invention is particularly applicable to methods of charge pumping capacitors and switching transistors in order to deliver a regulated high voltage output that is capable of supplying loads connected to the output, notably capacitive bit lines of memories.

2. Discussion of the Related Art

Methods for generating a voltage with a charge pump are well known. These charge pumps are notably used in integrated circuits in order to supply the high voltage necessary for writing the cells of a non volatile memory (15 to 20 volts). Charge pumps are also particularly well suited and used in integrated circuits that are destined for applications in smart cards, i.e. cards containing integrated circuits.

One of the problems associated with a smart card type of application is the ability to supply a high regulated voltage that is capable of supplying the capacitive bit lines without them collapsing. It is therefore necessary that these charge pumping methods supply an output that is sufficiently capable of driving the load.

In other types of applications, technical evolution allows the use of ever decreasing supply voltages, between 2 volts and 5 volts. At these voltage levels, parameters which used to be almost negligible now become particularly problematic. Notably, the threshold voltages of active elements are no longer negligible.

Classic charge pumps of the Schenkel type utilize diodes. These diodes (which are generally transistors connected as diodes) cause a loss of a threshold voltage when switched to charge their associated capacitors. Thus, instead of obtaining an output voltage equal to $(n+1) \cdot Vdd$, where n is the number of stages of the pump, we only recover as a first approximation $(n+1) * (Vdd-Vt)$.

This is why a particular pumping structure is being proposed, which will allow the total supply voltage to be transmitted to a capacitor. Such a structure is described in the European Patent Application 0 591 022 by the present applicant. This application describes a network of capacitors and switching transistors. In order not to have any losses due to the threshold voltage of the transistors, the gates of the switching transistors are controlled by a signal that has a peak voltage amplitude that is greater, by at least a threshold voltage, than the body effect of the drain voltage to be switched in order for all the supply voltage to be passed to an associated capacitor.

As elsewhere, the voltage to be switched is more or less high, and depends on the position of the transistor in the pump (the closer to the output, the greater to voltage to be switched). The gate voltage which is applied is also different according to this position: the gate voltage should not be too high (due to the risk of breakdown), however, it should be sufficient to ensure that the transistor conducts. For this a method of increasing the voltage, that is to say a bootstrap, is used.

This bootstrap method includes (FIG. 1) for each switching transistor T connected between two capacitors Ci, Cj in the network, a transistor TB controlled by a first secondary phase in order to short circuit the gate and the drain of transistor T and a bootstrap capacitor CB connected to the other secondary phase. Thus, the gate voltage initially precharges to the drain voltage (FBX=1) and is further increased by DV by the capacitor (FBN=1) (DV is approximately the amplitude of FBN) which turns the transistor hard on which switches its drain voltage to its source without significant loss.

Figure 1:
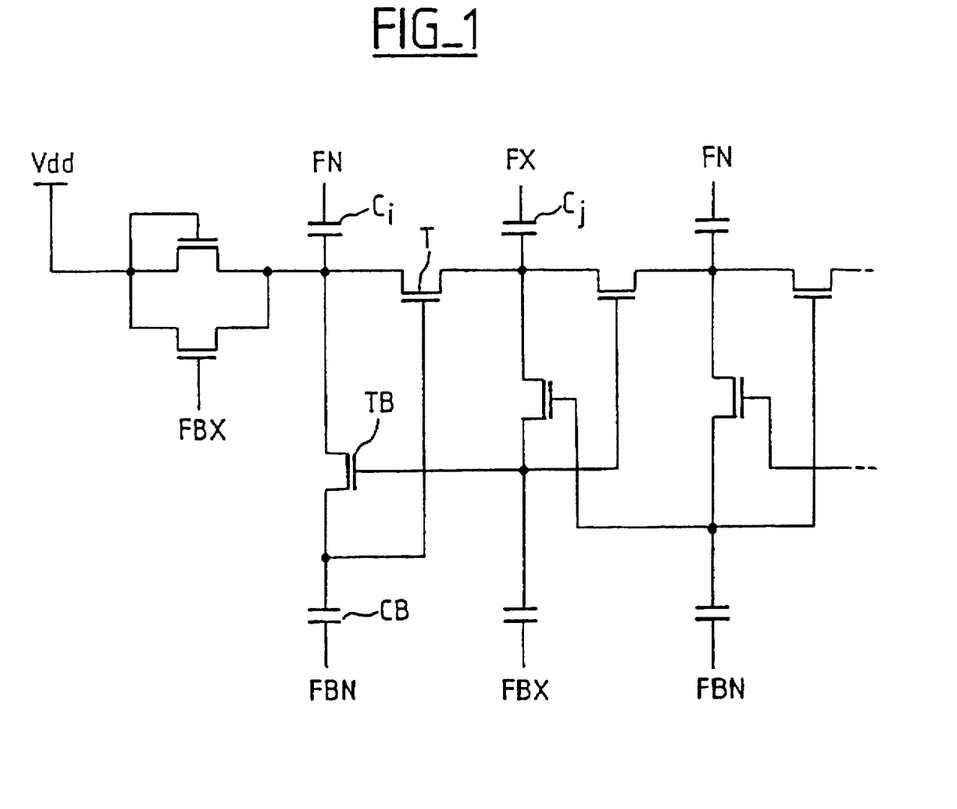
FIG. 1 illustrates a circuit diagram of a charge pump with bootstrapped transistors.
Figure 2:
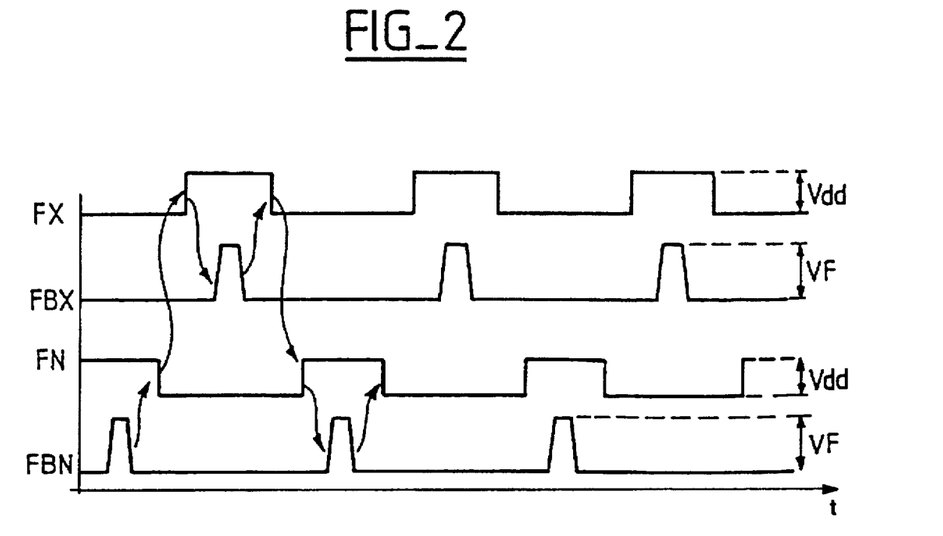
FIG. 2 illustrates waveforms of principal and secondary phases for controlling the charge pump illustrated in FIG. 1.

This structure of the state of the art technique necessitates two complimentary phases FN, FX that are non overlapping and that switch between 0 and Vdd and two corresponding secondary phases FBN and FBX that are more or less synchronized to the principal phases, each commutes between 0 and a voltage VF which is within the peak of the associated principal phase FN, FX. The voltage VF should be greater than the threshold voltage of the output transistor of the pump in addition to the body effect. It should be less than a limit voltage in order not to breakdown the gate oxide. In practice, if the output transistor of the pump is a natural transistor N (i.e. with a threshold voltage of approximately 0.5 volts) with 20 volts on its drain, the voltage VF may have a value between 4 volts when Vdd=1 volt and 10 volts when Vdd=5 volts. Such a structure and example of the phases of the corresponding control signals are illustrated in FIGS. 1 and 2 of the annexed drawings.

A problem in realizing this structure relates to the production of the secondary phases FBN and FBX. It is in effect desirable to have a charge pump which functions with a frequency that is as stable as possible, notably independent of variations of the supply voltage, and as high as possible, in order to ensure the best output from the charge pump. This is accentuated when using a low supply voltage because the pump must comprise more stages in order to obtain the required level of output voltage. It is known that the output of a charge pump is inversely proportional to the number of stages that it comprises and is proportional to its switching frequency. Thus, the greater the number of stages there are, the greater the switching frequency must be in order to have the required output.

Yet, in the state of the art, these secondary phases that have amplitudes which are greater than the supply voltage Vdd are obtained by voltage multipliers having capacitors and retard circuits, that is to say by several "bootstraps" connected in series. This implies a reaction time that, in relative terms, is very long for supplying the peak voltage and which is proportional to the number of bootstraps necessary in order to obtain the required amplitude multiplied by the reaction time of a bootstrap. One is therefore very limited regarding the switching frequency, which, in turn, limits the number of stages possible in a pump. Therefore, one is not able to work with very low supply voltages using such a method. Furthermore, each successive bootstrap consumes part of the energy supplied by the previous bootstrap in order to increase the voltage level. It is therefore necessary to use large capacitors which occupy a lot of space and produce noise. Finally, it is also necessary to regulate the voltage produced in order not to damage the gate oxide of the bootstrapped switching transistors of the charge pump whose secondary phase amplitudes are applied via a capacitor.

SUMMARY OF THE INVENTION

An object of the present invention is to resolve these different inconveniences. According to an embodiment of the present invention, in a network structure of capacitors and switching transistors that have two phases of functioning, these technical problems are solved when the first phase isolates all the capacitors and simultaneously charges them all to the level of the supply voltage, and the second phase connects all these capacitors in series between the supply voltage and an output node of the network in order to instantaneously increase the voltage level of this node to a level greater than the supply voltage Vdd. The capacitors are all connected in series by transistors that are connected between them and are controlled by a signal with a peak voltage greater than the voltage to be switched to the output node of the network.

According to an embodiment of the present invention, this signal is generated from a regulated voltage in order to have, at the output node of the network, a signal having a regulated amplitude.

According to an embodiment of the present invention, the generator of the peak amplitude, which is greater than the supply voltage, may work at a greater switching frequency that is capable of supplying capacitive loads. Advantageously, according to an embodiment of the present invention, the generator is capable of supplying a signal with a peak amplitude which is well regulated and that does not go beyond a determined voltage limit. The peak generator, according to an embodiment of the present invention, is also particularly well suited for supplying the secondary phases that are necessary for the type of pump having bootstrapped transistors.

An embodiment of the present invention includes circuitry for generating a peak voltage amplitude that is greater than the supply voltage and that comprises a network of capacitors. The circuitry includes a control circuit having switching transistors and two phases or modes of functioning, a first phase isolates all the capacitors and simultaneously charges them all to the level of the supply voltage, and the second phase connects all these capacitors in series between the supply voltage and an output node of the network in order to instantaneously increase the voltage level of this node to a level greater than the supply voltage Vdd. The transistors are placed between these capacitors, so as to connect them all in series, and are controlled by a signal with a peak voltage greater than the voltage to be switched to the output node of the network.

BRIEF DESCRIPTION OF THE DRAWINGS

Other characteristics and advantages will become apparent by the following description of a preferred, non-limiting embodiment of the present invention described by way of example with reference to the accompanying drawings, in which.

DETAILED DESCRIPTION

Figure 3:
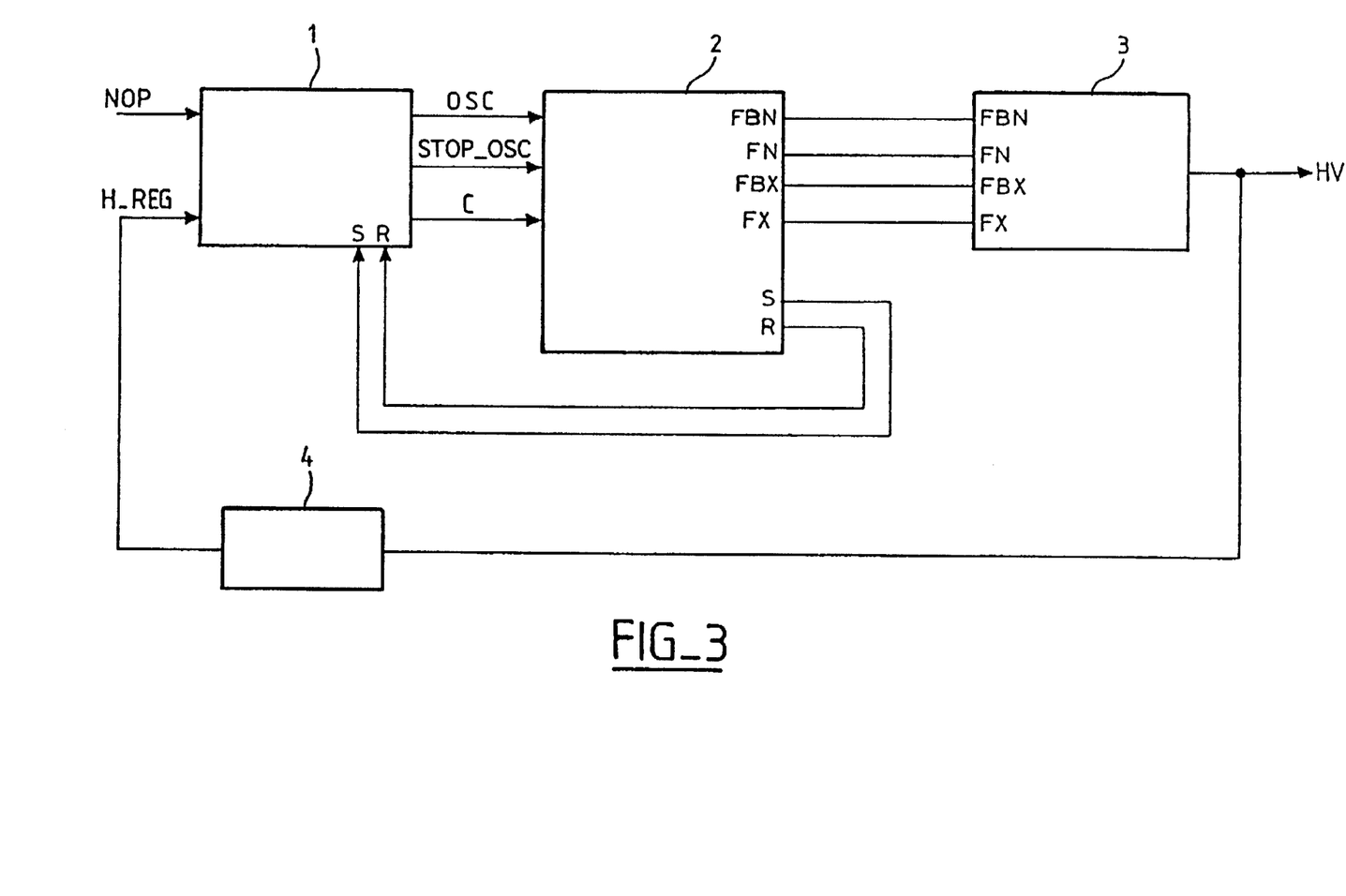
FIG. 3 illustrates a general block diagram of a high voltage generator having a regulated output using a charge pump with bootstrap transistors.

A high, regulated, voltage generator HV is represented in FIG. 3. It typically includes an oscillator circuit 1 for producing a clock signal which will allow a phase generation circuit 2 to generate the principal phases FN and FX and the secondary phases FBN and FBX that are necessary for controlling a charge pump 3 having bootstrapped transistors (see FIG. 1).

Circuit 1 may, of course, use an external clock signal. However, in the example presented, it is preferable to choose a ring oscillator such as described in FR 95 07617 by the applicant, which supplies an optimum frequency according to variations of the supply voltage Vdd. In simplified terms, this oscillator circuit includes an impulse generator C that is applied to an input of a divider so as to obtain at its output a clock signal OSC having a cyclic ratio ½. The impulse generator includes a classic RC type oscillating circuit and a hysterisis comparator. The frequency of the oscillator circuit 1 is regulated by a classic regulation circuit 4. This regulation circuit 4 receives at its input the high voltage HV that is produced by the pump 3 and supplies at an output a regulation signal H-REG that is capable of stopping or starting the oscillator circuit according to whether the high voltage HV is at a desired value or not. The regulation circuit allows the reintroduction of the high voltage HV produced by the pump 3 which is independent of variations in the supply voltage. A signal NOP is applied to a second input of the oscillator circuit which corresponds to a shut down signal of the high voltage generator. This signal allows the activation of the generator only when it is required. For example, in a memory circuit, the generator will only be active during the execution of the programming phase. These two signals are combined in order to produce a start/stop signal for the pump which is denoted STOP_OSC in the figure and which is notably applied to the phase generation circuit. In the example, the oscillator circuit 1 also receives two signals R and S that are produced by the phase generation circuit 2. These two signals allow the oscillator to be slowed down or sped up so as to take into account the variations in the supply voltage Vdd. More precise details regarding the above can be found in the French application FR 95 07617.

The three signals OSC, STOP_OSC and C are applied to the input of the phase generation circuit 2. In the example, they act upon the principal phases denoted by FN and FX and the secondary phases denoted by FBN and FBX, in order to control the charge pump 3 as illustrated in FIGS. 1 and 2. In the example, this phase generation circuit 2 further includes a circuit for enslaving the frequency of the clock signal OSC to the phase signals FBN, FN, FBX and FX. This enslavement circuit supplies the signals R and S that are applied to the input of oscillator circuit 1.

Figure 4:
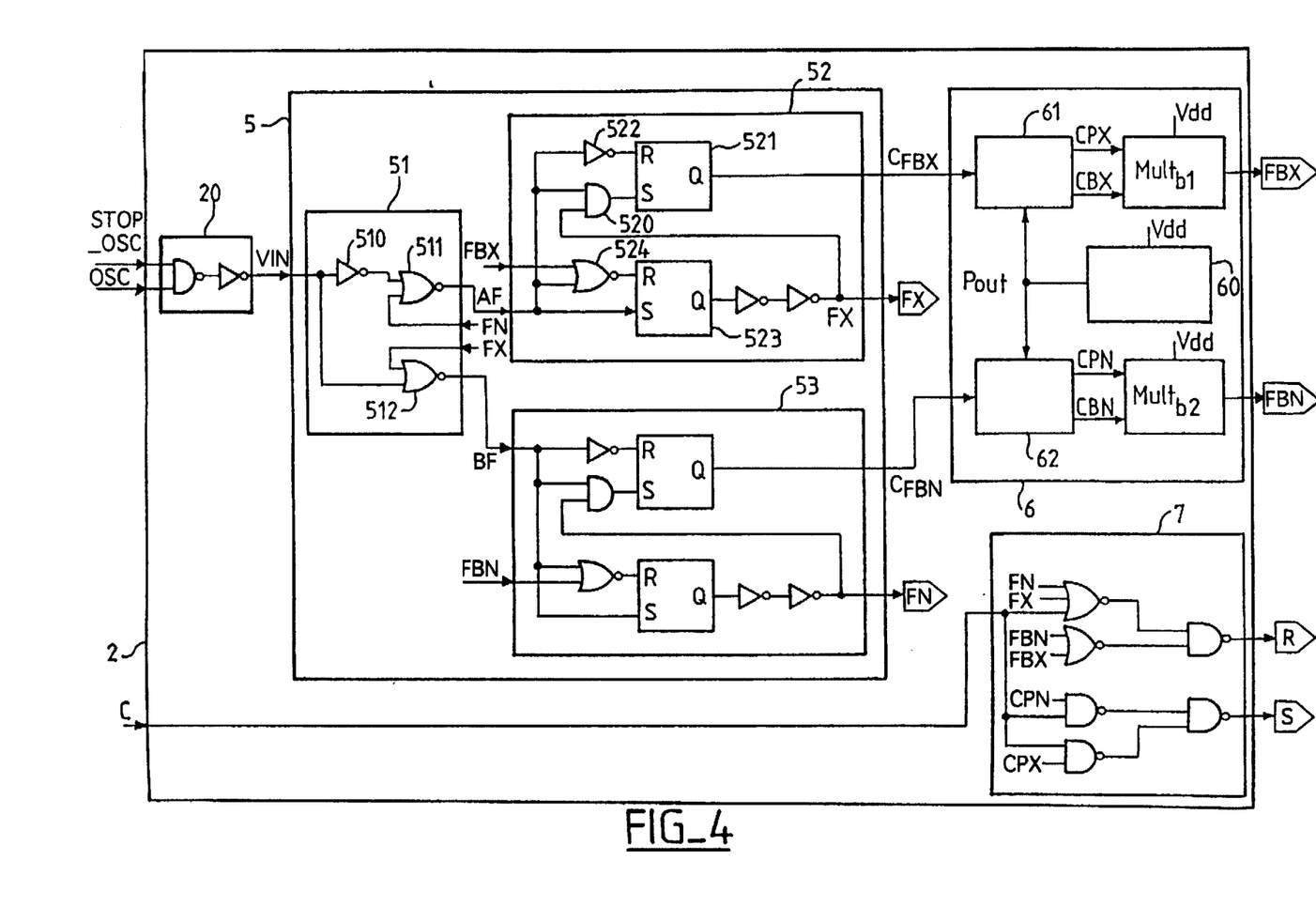
FIG. 4 illustrates a schematic block diagram detailing a circuit and method for supplying the principal and secondary phases of the high voltage generator according to an embodiment of the present invention.

Phase generation circuit 2 is detailed in FIG. 4. The two signals STOP_OSC and OSC are firstly applied to a logic gate circuit 20 (series connected NAND and inverter gates) in order to transmit a base clock signal VIN, which follows the clock signal OSC when the generator is active (STOP_OSC=1).

As mentioned earlier, the principal phases FN and FX are complimentary and non-overlapping and the corresponding phases FBN and FBX respectively switch within the peak amplitudes of their associated principal phase signals, as represented in FIG. 2. The switching control that produce these different phases therefore depends upon the state of these different phases and therefore the corresponding circuitry is quite complex. In the illustrated example of FIG. 4, the realization of this circuitry is split into several circuits.

A circuit 5, generates the principal phases FX and FN, and receives at its inputs the base clock signal VIN and the secondary phases FBX and FBN. Circuit 5 produces at its output the principal phases FX and FN and the switching control signals for the secondary phases denoted by CFBX and CFBN. Circuit 6 generates the secondary phases with a peak high voltage. In the example of FIG. 4, a circuit 7 is depicted for enslaving the frequency of the oscillator circuit 1 to the different phase signals and switching control signals. The enslavement circuit 7 is not described in detail. However, it is sufficient to simply indicate that it comprises logic gates that produce the signals R and S for the oscillator circuit in order to retard or accelerate the oscillator according to the amplitude and the sequence of the different signals produced by the secondary phase generation circuit. In this way an optimum frequency for the pump is used in order to follow variations in the supply voltage.

The circuit 5 for generating the principal phases includes a first circuit 51 that supplies the switching control 0 to Vdd for each of the principal phases FN and FX. Thus, the switching control AF for the phase FX is generated when the clock signal VIN has switched to a high state and if the phase FN has a low state. The control signal BF is generated in a similar manner for the phase FN when the clock signal has switched to a low state and if the phase FX is at a low state.

The circuit 51 includes an inverter 510 for applying the inverse signal /VIN to a NOR gate 511 which also receives the signal FN. This gate 511 outputs the signal AF. Finally, another NOR gate 512 receives the signals VIN and FX in order to output the signal BF. The switching control signals AF and BF are respectively applied to a circuit 52 and a circuit 53. These two circuits are similar and therefore only circuit 52 will be explained.

Circuit 52 generates the phase FX and the switching control signal CFBX for the secondary phase FBX (see FIG. 2). Circuit 52 includes an AND gate 520 that receives at its input the signals AF and FX. The output of the AND gate 520 is applied as an input S to a first flip-flop 521. An inverter 522 applies the inverse signal /AF to the input R of the flip-flop which delivers on its output Q the switching control signal CFBX. Thus, (if we note that the logic states 0 and 1 of the signals correspond to the voltage levels 0 volts or Vdd) the signal CFBX is taken to a logic 1 state when AF and FX are both at a logic 1 state and forced to a 0 when AF has a 0 logic state.

Circuit 52 further includes a second flip-flop 523 which receives as an input S and the signal AF. A NOR gate 524 receives at its input the signals AF and FBX. The output of gate 524 is applied to the input R of the flip-flop 523. The output Q is followed in this example by two inverters which deliver as an output the signal FX. Thus, FX is taken to a logic 1 state by the signal AF. It will only change to a 0 logic state when the secondary phase FBX itself passes back to a 0 logic state. Thus we have the following sequence: AF 0 to 1, FX 0 to 1, CFBX 0 to 1, AF 1 to 0, CFBX 1 to 0, and FX 1 to 0.

Circuit 53 has the same structure as circuit 52 in order to supply the signals FN and CFBN from the signal BF for a similar sequence: BF 0 , to 1 , FN 0 to 1 , CFBN 0 to 1 , BF 1 to 0, CFBN 1 to 0, and FN 1 to 0.

Circuit 6, which generates the secondary phases, is controlled by the switching control signals CFBX and CFBN. It principally includes a circuit 60 which generates a regulated voltage Pout for the two circuits 61 and 62 which are level translators, and two circuits Multb1 and Multb2 in order to respectively supply the secondary phases FBX and FBN.

Figure 5:
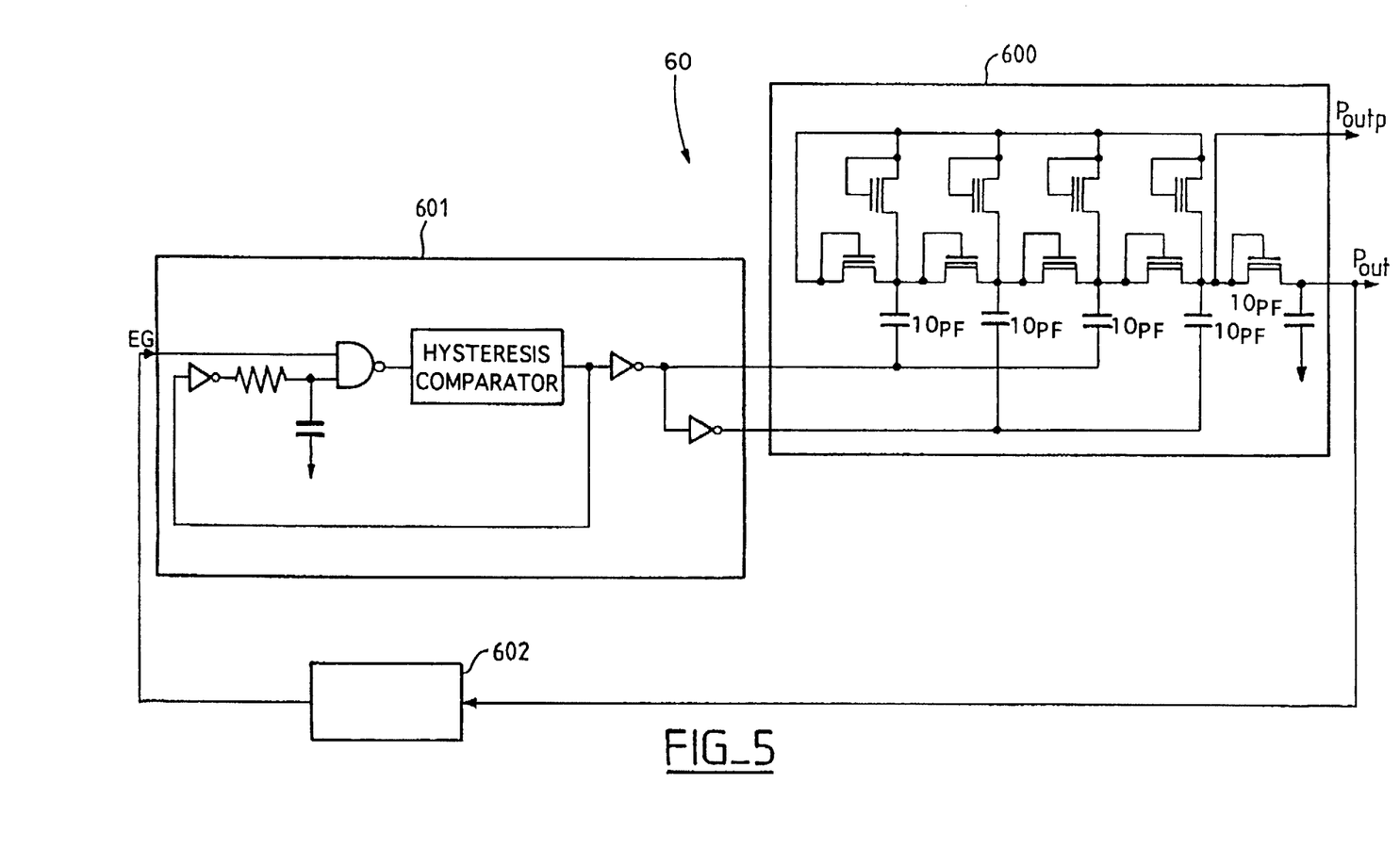
FIG. 5 illustrates a classic Schenkel type charge pump as used in the circuit and method for generating the secondary phases illustrated in FIG. 4.

A schematic block diagram of the circuit 60 which generates the regulated voltage Pout is represented in FIG. 5. It comprises a classic, well known, Shenkle type charge pump 600 which has diodes and capacitors. The two complimentary phases PH and PHB that are applied to the capacitors are supplied by a ring oscillator 601 and the regulation of the oscillator frequency with the respect to the output voltage of the pump is obtained by a regulator 602. These circuits are also well known and will therefore not be described in detail. The pump 600 provides on an output a regulated voltage Pout to the source of a natural transistor that is connected as a diode. It is also possible to use the drain voltage of this transistor as another output Poutp which has the advantage of being a threshold voltage greater than the voltage Pout.

Circuit 61 therefore receives as an input the control signal CFBX and is supplied by the regulated voltage Pout (FIG. 4). It supplies as an output a first signal CPX that has a peak amplitude on the order of 2*Pout and a second signal CBX with a peak having an amplitude on the order of Pout.

Likewise, circuit 62 therefore receives as an input the control signal CFBN and is supplied by the regulated voltage Pout (FIG. 4). It supplies as an output a first signal CPN with a peak having a amplitude on the order of 2*Pout and a second signal CBN with a peak having an amplitude on the order of Pout.

The circuits 61 and 62 have the same structure. This structure and its functionality are detailed in relation to FIG. 6 for circuit 61. An analogy of this description is applicable to circuit 62.

Figure 6:
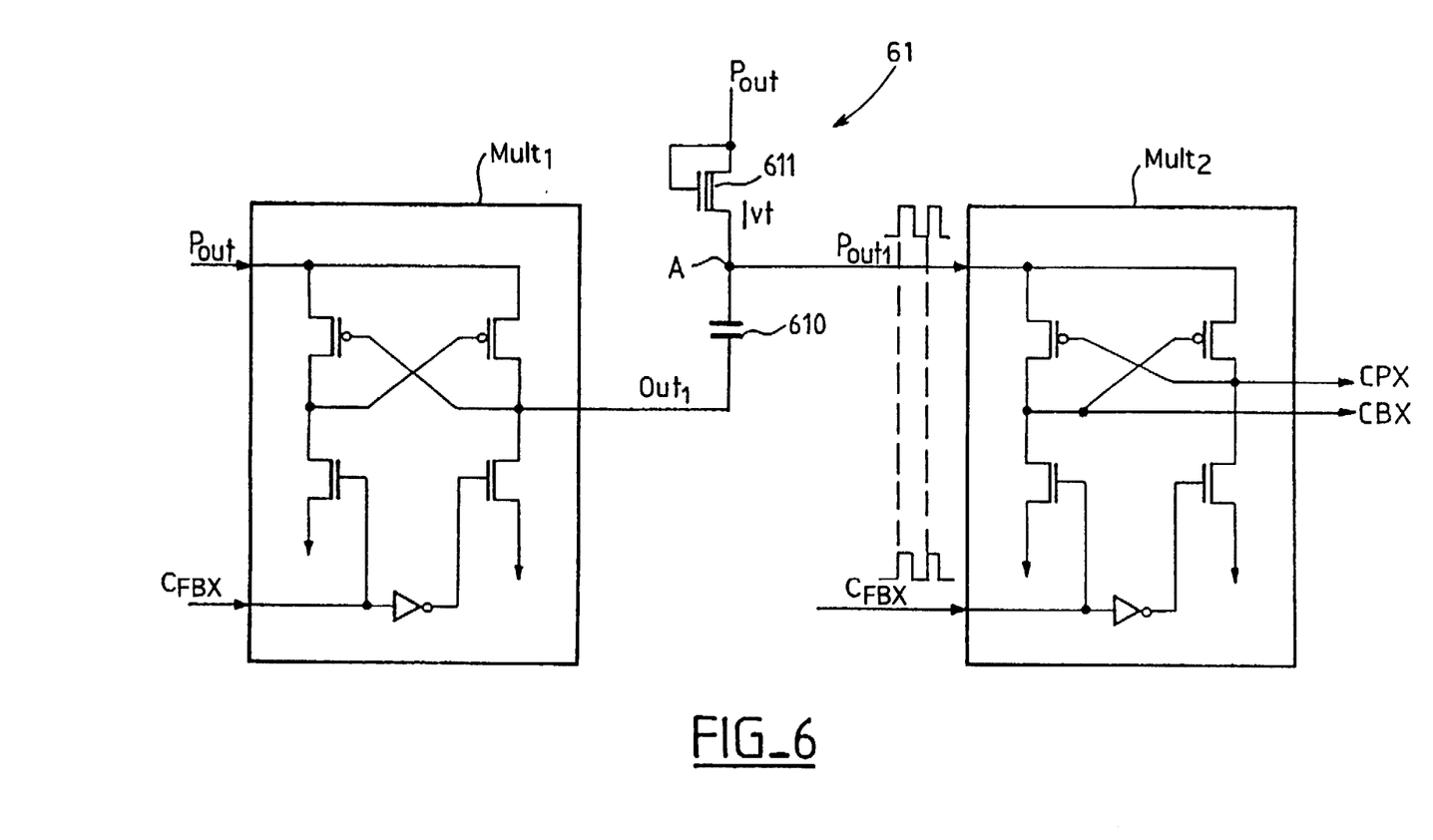
FIG. 6 illustrates an electrical circuit diagram of a level translator as used in the circuit and method for generating the secondary phases illustrated in FIG. 4.

Circuit 61 comprises a first level translator Mult1 that has a classic structure with two branches of two transistors, here a P-type transistor and an N-type transistor connected in series between the regulated voltage Pout that is supplied by the circuit 60 and ground. The control signal CFBX allows the output node of one branch or the other to be switched to the voltage Pout or ground, according to its level Vdd or 0 volts. In the example, the output Out1 switches between 0 volts and Pout in phase with the control signal CFBX (Out1=0 when CFBX=0 and OUT1=Pout when CFBX= Vdd), at a rate determined by the frequency of the base clock signal VIN. (The P-type transistor which switches the level Pout is very conductive; there is no loss due the threshold voltage).

The output Out1 is connected to a capacitor 610 which is followed by a diode connected transistor 611 which forms a voltage doubler. In the example, transistor 611 is an natural N-type transistor. Its gate and drain are both connected to the regulated voltage Pout. Thus, on the output A, which is a common connection between capacitor 610 and transistor 611, a signal is recovered which has a regulated peak Pout1 that commutes between 2*Pout-Vt and Pout-Vt.

In fact, when the output Out1 is at its low level, the capacitor charges to the level Pout-Vt, which is transmitted on node A by the natural transistor 611. When the output Out1 is at its high level Pout, the capacitor discharges and node A returns to 2*Pout-Vt.

This signal Pout1 which is in phase with the control signal CFBX is applied so as to supply a second translator Mult2 which receives as an input the same switching control signal CFBX so that it can switch in phase with the first translator. This second translator, that has a structure which is identical to the first, supplies two signals with peak voltages, one in phase with CFBX and switching between 0 volts and 2*Pout-Vt, the other having an opposite phase to CFBX and switching between 0 volts and Pout-Vt. It should be noted that if the regulated signal Poutp from charge pump 600 (FIG. 5) is instead supplied by circuit 60, a threshold voltage Vt is gained in the amplitude. The two signals at the output of the second translator are respectively denoted CPX and CBX. They are applied to a circuit Multb1 of the invention in order to generate the secondary phase FBX.

In a similar manner to that of circuit 61, circuit 62 generates two signals with peak voltages, one in phase with the control signal CFBN and switching between 0 volts and 2*Pout-Vt, and the other having an opposite phase with the control signal CFBN and switching between 0 volts and Pout-Vt. These two signals denoted CPN and CBN are applied to a circuit Multb2 in order to generate the secondary phase FBN.

According to an embodiment of the present invention, the two circuits Multb1 and Multb2 that generate the signals FBX and FBN have the same structure. The following description referencing FIG. 7 for the circuit Multb1 also applies to the circuit Multb2.

Figure 7:
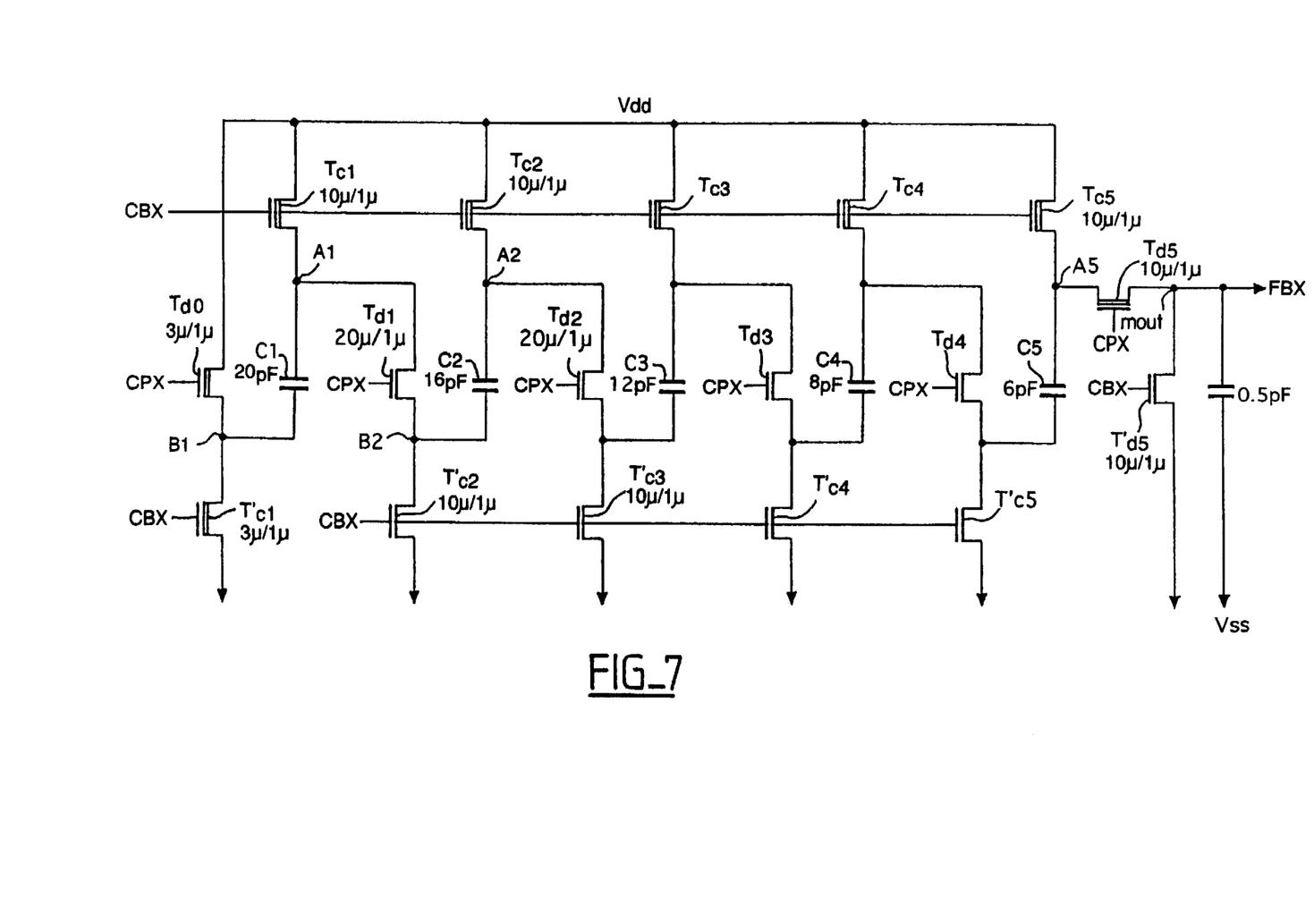
FIG. 7 illustrates a circuit and method for generating the peak high voltage according to an embodiment of the present invention using the circuit and method for generating the secondary phases illustrated in FIG. 4.
Figure 8A:
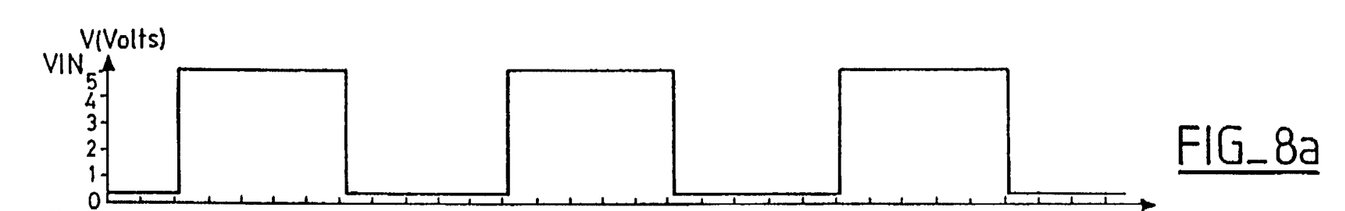
FIGS. 8a–8e illustrate waveforms of the signals obtained with the circuit method for generating the secondary phases illustrated in FIG. 4.
Figure 8B:
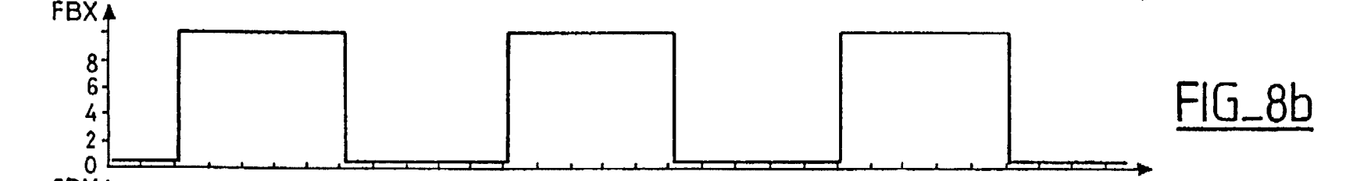
Figure 8C:
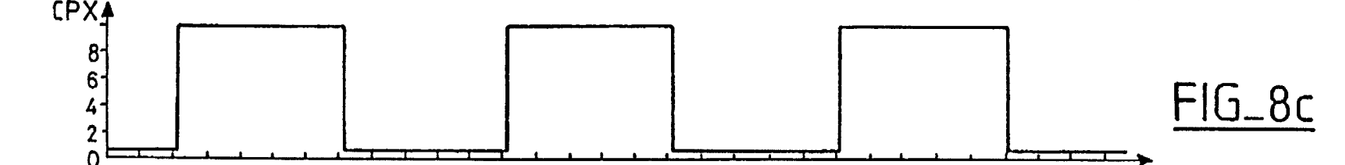
Figure 8D:
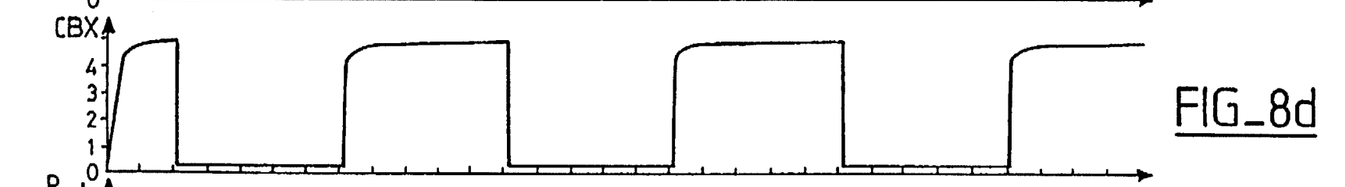
Figure 8E:
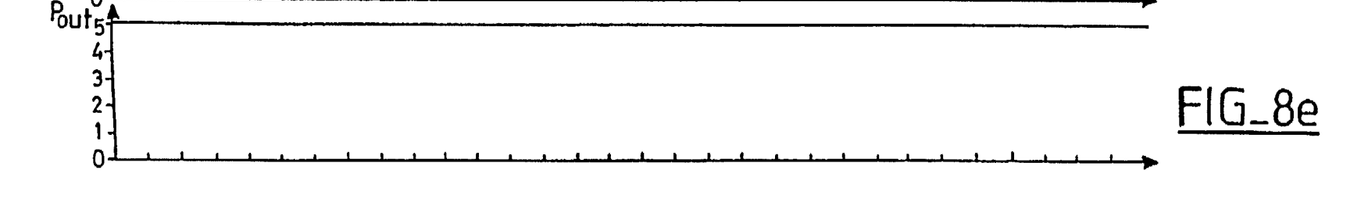

The circuit Multb1 has as its aim, the multiplication of the supply voltage Vdd, to which it is applied, so as to supply a signal FBX, that has a peak amplitude that is greater than the supply voltage Vdd, by using two peak control signals that are in opposition regarding phase, the amplitude of one of the signals being greater than the supply voltage. In the example, these peak signals are CBX and CPX that are supplied by the circuits 60 and 61 that have previously been described. It is possible that these peak signals can be derived in another manner, which will be dependant upon the particular application. However, they should satisfy two criteria: their phases should be in opposition and one of them should have an amplitude that is greater than that which is supplied at the output, as shall be seen below.

The circuit Multb1 has the structure made up of a network of capacitors and switching transistors that has two phases of functioning, a first phase that isolates all the capacitors and simultaneously charges them all to the level of the supply voltage, and a second phase that connects all these capacitors in series between the supply voltage and an output node of the network in order to instantaneously increase the voltage level of this node to a level greater than the supply voltage Vdd. The capacitors are all connected in series by transistors that are placed between them and are controlled by a signal with a peak voltage greater than the voltage to be switched to the output node of the network.

The other peak signal CBX is applied to the gates of the switching transistors in order to simultaneously apply the supply voltage to each of the capacitors. An amplitude on the order of the supply voltage (Vdd+Vt) is therefore sufficient for this signal.

In the example, the first phase of functioning therefore corresponds when CPX=0 and CBX=Pout (by making the abstraction of Vt) in order to charge the capacitors. The second phase of functioning corresponds when CPX= 2*Pout and CBX=0, in order to connect the capacitors in series between the supply voltage and the output node mout of the network and to instantaneously increase the voltage level at this node from zero volts to a level that is greater than the supply voltage Vdd, but which is less than the high level CPX, because the transistor can only switch a drain voltage that is approximately equal to its gate voltage: the structure allows one to obtain an output that has an amplitude that is limited.

The amplitude of the signal CPX should therefore be at least equal to the desired voltage level at the output mout, and will be dependant upon the value of Vdd and the number of stages of the generator. But it also should be less than the breakdown voltage of the gate oxide of the transistors (approximately 20 volts). Furthermore, as in the example, the signal CPX is obtained from a regulated voltage, therefore, the structure of the generator Multb1 supplies a signal having a regulated amplitude.

If we limit the structure to five stages as represented in FIG. 7, we therefore have for each capacitor a network, for example, for capacitor C1 we have:

a first switching transistor Tc1 that is connected between the voltage Vdd and first terminal A1 of the capacitor C1 and a second switching transistor T'c1 that is connected between a second terminal B1 of capacitor C1 and the voltage Vss, these two transistors being controlled via their gates by the signal CBX; and a third switching transistor Td1 that is connected between the first terminal A1 of said capacitor C1 and the second terminal B2 of the following capacitor C2, which is controlled via its gate by the signal CPX. The output node mout is supplied by the third transistor Td5 that is associated with the last capacitor C5 of the network.

A switching transistor T'd5, which is controlled by the signal CBX, is additionally incorporated and is connected between the output node mout and the voltage supply Vss in order to isolate the output node and the Vss pull-down that is operational during the charging if the capacitors. Another switching transistor Td0 is also additionally incorporated, which is controlled by the signal CPX, that connects the second terminal B1 of the first capacitor to the voltage Vdd in order to connect the capacitors in series between the supply voltage and the output node mout. The circuit Multb1 will in practice be realized by using N-type transistors.

It is preferred that the first and second switching transistors of the network are natural N-type transistors, which have a threshold voltage (0.5 volts) that is less than gate enhanced N-type transistors, in order that they conduct with the least amount of loss of the voltage Vdd onto the capacitors.

For the same reasons, a natural N-type transistor is preferred for the third switching transistor that is connected in series with the first terminal of the last capacitor C5 and the output node mout in order to switch without any losses the high voltage that is produced. This transistor also ensures the regulation of the switched voltage by means of the amplitude of the signal CPX which controls its gate.

The afore-described structure allows one to immediately obtain at the output mout a signal FBX that is in phase with the control signal CPX, that has an amplitude that is greater than the supply voltage and that is capable of charging capacitive elements such as bootstrap capacitors of the charge pump 3, which is not the case with regards to the signal CPX. This signal FBX is further regulated by the control signal CPX itself. Such a method is therefore particularly advantageous in an application, such as has been described herein, for supplying the secondary phases for the charge pump 3.

By its immediate reaction time and its increased output (with the capacitors isolated and placed in parallel they are immediately charged to Vdd, and with the capacitors being subsequently placed in series they immediately increase the output level) this method and circuit allows one to work at a high frequency and to control capacitive charges.

In a CMOS technology, we have therefore been able to reduce the supply voltage Vdd to at least 1 volt (0.9 volts) and yet supply an amplitude on the output mout on the order of 4 volts with five stages in the multiplier according to the present invention and have been able to supply the signals FBX, FNX to charge pumps 3 that have approximately thirty stages and all at 2 MHz. At this same frequency, we have obtained, with a supply voltage Vdd of 5 volts, an amplitude on the output mout of 9.7 volts. FIGS. 8a to 8e illustrate the form of the different signals obtained (/VIN, FBX, CPX, CPN and Pout).

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A circuit for generating a voltage having a peak amplitude that is greater than a voltage level of a supply voltage, comprising:

a network of capacitors having an output node; and a control circuit, for controlling a plurality of switching transistors having two modes of functioning, a first mode for isolating all the capacitors in the network and simultaneously charging them to the voltage level of the supply voltage, and a second mode for connecting all the capacitors in the network in series between the supply voltage and the output node of the network to instantaneously increase a voltage level of the output node to a voltage level that is greater than the voltage level of the supply voltage;

wherein switching transistors that are placed between each capacitor in the network so as to connect all the capacitors in series are controlled by a first signal having a peak voltage that is greater than the voltage level to be switched to the output node of the network.

2. The circuit of claim 1, wherein, for each respective capacitor in the network of capacitors, the control circuit includes:

a first switching transistor connected between the supply voltage and a first terminal of the respective capacitor;

a second switching transistor connected between a second terminal of the respective capacitor and a reference voltage, the first and second switching transistors being controlled by their gates by a second signal; and a third switching transistor connected between the first terminal of the respective capacitor and the second terminal of a following capacitor that is next in the network of capacitors, the third switching transistor being controlled by its gate by the first signal, the output node of the network being supplied by the third switching transistor that is connected in series with the first terminal of a last capacitor in the network of capacitors.

3. The circuit of claim 2, wherein the plurality of switching transistors are N-type transistors and the first and second switching transistors are natural N-type transistors.

4. The circuit of claim 2, wherein the third transistor connected in series with the first terminal of the last capacitor is a natural N-type transistor and limits the voltage level it switches based on an amplitude of the first signal that is applied to its gate.

5. The circuit of claim 4, further comprising a fourth transistor, controlled by the second signal, connected between the output node of the network and the reference voltage, to isolate the output node and a pull-down of the output node to a level of the reference voltage during the charging of the capacitors.

6. The circuit of claim 2, further comprising an additional switching transistor, controlled by the first control signal, to connect the second terminal of a first capacitor in the network to the supply voltage when the network of capacitors are connected in series.

7. The circuit of claim 1, further comprising:

a Schenkel type charge pump for supplying a regulated voltage; and first and second level translation circuits to receive the regulated output voltage and a third signal having a peak amplitude of the supply voltage and generate the first and second signals.

8. A high voltage charge pump type generator including a network of capacitors and switching transistors that are controlled by two non-overlapping clock signals that switch between a reference voltage level of a reference voltage and a supply voltage level of a supply voltage and two other clock signals that respectively switch substantially in phase with the two non-overlapping clock signals but between the reference voltage level and a voltage level that is greater than the supply voltage level, wherein the two other clock signals are respectively supplied by a circuit for generating a peak voltage comprising:

a second network of capacitors having an output node; and a control circuit, for controlling a plurality of switching transistors having two modes of functioning, a first mode for isolating all the capacitors in the second network and simultaneously charging them to the supply voltage level, and a second mode for connecting all the capacitors in the second network in series between the supply voltage and the output node of the second network to instantaneously increase a voltage level of the output node to a voltage level that is greater than the supply voltage level;

wherein switching transistors that are placed between each capacitor in the second network so as to connect all the capacitors in series are controlled by a first signal of the two other clock signals having a peak voltage that is greater than the voltage level to be switched to the output node of the network.

9. The high voltage charge pump of claim 8, wherein the high voltage charge pump is formed in an integrated circuit.

10. The high voltage charge pump of claim 9, wherein the integrated circuit is included in a smart card.

11. A circuit to generate an output signal having an amplitude that is greater than a supply voltage, the circuit comprising:

a plurality of capacitors forming a network of capacitors, each capacitor in the network having a first terminal and a second terminal, the first terminal of each capacitor being coupled to the supply voltage and the second terminal of each capacitor being coupled to a reference voltage;

a plurality of switching transistors including a plurality of series switching transistors, each respective series switching transistor being coupled in series between the first terminal of a respective capacitor in the network and the second terminal of a next capacitor that is next in the network, a last series switching transistor being coupled between the first terminal of a last capacitor in the network and an output of the network; and a control circuit, coupled to each of the plurality of switching transistors, to generate a first signal that isolates each capacitor in the network and simultaneously charges each capacitor to a voltage level of the supply voltage and a second signal that connects each capacitor in the network in series between the supply voltage and the output of the network to generate the output signal;

wherein the first signal has a peak amplitude that is approximately equal to the supply voltage, the second signal has a peak amplitude that is greater than the output signal, and the first signal is in phase opposition to the second signal.

12. The circuit of claim 1, wherein a peak amplitude of the output signal is limited to the peak amplitude of the second signal.

13. The circuit of claim 11, wherein the plurality of switching transistors further includes:

a plurality of second switching transistors, a respective second switching transistor being coupled between the supply voltage and the first terminal of each respective capacitor in the network, each respective second switching transistor being coupled to the first signal; and a plurality of third switching transistors, a respective third switching transistor being coupled between the reference voltage and the second terminal of each respective capacitor in the network, each respective third switching transistor being coupled to the first signal;

wherein each respective series switching transistor is coupled to the second signal.

14. The circuit of claim 13, wherein the plurality switching transistors are N-type transistors and the plurality of second switching transistors and the plurality of third switching transistors are natural N type transistors.

15. The circuit of claim 14, wherein the last series switching transistor is a natural N-type transistor that limits a peak amplitude of the output signal to the peak amplitude of the second signal.

16. The circuit of claim 13, further comprising:

an output transistor coupled between the output of the network and the reference voltage, the output transistor being coupled to the first signal to isolate the output of the network and pull down the output of the network to the reference voltage during charging of the plurality of capacitors.

17. The circuit of claim 16, further comprising:

an input transistor coupled between the supply voltage and the first terminal of a first capacitor in the network, the input transistor being coupled to the second signal.

18. The circuit of claim 17, wherein the plurality switching transistors are N-type transistors, the plurality of second switching transistors and the plurality of third switching transistors are natural N type transistors, and the last series switching transistor is a natural N-type transistor that limits a peak amplitude of the output signal to the peak amplitude of the second signal.

19. The circuit of claim 13, further comprising:

an input transistor coupled between the supply voltage and the first terminal of a first capacitor in the network, the input transistor being coupled to the second signal.

20. A high voltage generator comprising:

an oscillator circuit to generate an oscillating clock signal;

a Schenkel type charge pump including an output transistor to supply an output voltage; and a phase generation circuit coupled between the oscillator circuit and the charge pump to receive the oscillating clock signal and generate two pairs of signals including a first pair of signals and a second pair of signals, the first pair of signals including a first signal and a second signal that are complementary to each other, non-overlapping, and switch between a reference voltage level of a reference voltage and a supply voltage level of a supply voltage, the second pair of signals including a third signal and a fourth signal corresponding to the first and second signals, respectively, and switching between the reference voltage level and a third voltage level when the first and second signals, respectively, are at the supply voltage level, the third and fourth signals having an amplitude that is greater than a threshold voltage of the output transistor of the charge pump in addition to a body effect of the output transistor, wherein the phase generation circuit includes:

a first network of capacitors coupled to a first plurality of switching transistors having two modes of operation, a first mode isolating each of the capacitors in the first network and simultaneously charging each of the capacitors to the supply voltage level, and a second mode connecting each of the capacitors in the first network in series between the supply voltage and an output node of the first network to provide the third signal; and a second network of capacitors coupled to a second plurality of switching transistors having two modes of operation, a third mode isolating each of the capacitors in the second network and simultaneously charging each of the capacitors to the supply voltage level, and a fourth mode connecting each of the capacitors in the second network in series between the supply voltage and an output node of the second network to provide the fourth signal.

21. The generator of claim 20, further comprising:

a regulation circuit, coupled between the charge pump and the oscillator circuit, to receive the output voltage of the charge pump and reintroduce the output voltage to the oscillator circuit independent of variations in the supply voltage.

22. The generator of claim 21, wherein the oscillator circuit includes:

a first output terminal to provide the oscillating clock signal to the phase generation circuit;

a second output terminal to provide a start/stop signal to the phase generation circuit that one of stops and starts the charge pump;

a first input terminal to receive a first slave signal from the phase generation circuit and increase an oscillation frequency of the oscillating clock signal; and a second input terminal to receive a second slave signal from the phase generation circuit and decrease the oscillation frequency of the oscillating clock signal.

23. The generator of claim 22, wherein the phase generation circuit further includes:

a logic circuit to receive the oscillating clock signal and the start/stop signal and provide a base clock signal that follows the oscillating clock signal when the start/stop signal has a first value, the base clock signal having a fixed value when the start/stop signal has a second value.

24. The generator of claim 23, wherein the phase generation circuit further includes:

a first circuit to receive the base clock signal and the second pair of signals and generate the first pair of signals and a pair of switching control signals, the pair of switching control signals including a first switching control signal corresponding to the third signal and a second switching control signal corresponding to the fourth signal; and a second circuit, coupled to the first circuit, to receive the first and second switching control signals and generate the third and fourth signals.

25. The generator of claim 24, wherein the first circuit includes:

a switching control circuit to receive the base clock signal and generate first and second control signals for the first and second signals, respectively;

a first signal generation circuit to receive the first control signal and the third signal and generate the first signal and the first switching control signal; and a second signal generation circuit to receive the second control signal and the fourth signal and generate the second signal and the second switching control signal.

26. The generator of claim 24, wherein the second circuit includes:

a regulated voltage generator to provide a regulated output voltage having an amplitude;

a first level translator, coupled to the regulated voltage generator, to receive the first switching control signal and provide first and second mode signals, the first mode signal having a peak amplitude approximately equal to amplitude of the regulated output voltage, and the second mode signal having a peak amplitude approximately equal to twice the amplitude of the regulated output voltage;

a first multiplier, coupled to the first level translator, to receive the first and second mode signals and generate the third signal;

a second level translator, coupled to the regulated voltage generator, to receive the second switching control signal and provide third and fourth mode signals, the third mode signal having a peak amplitude approximately equal to amplitude of the regulated output voltage, and the fourth mode signal having a peak amplitude approximately equal to twice the amplitude of the regulated output voltage; and a second multiplier, coupled to the second level translator, to receive the third and fourth mode signals and generate the fourth signal.

27. The generator of claim 26, wherein the regulated voltage generator includes:

a ring oscillator;

a second Schenkel type charge pump coupled to the ring oscillator to provide the regulated output voltage on an output terminal; and a regulator coupled to the output terminal of the second charge pump and an input of the ring oscillator.

28. The generator of claim 26, wherein the second mode signal has a peak amplitude that is at least equal to a peak amplitude of the third signal.

29. The generator of claim 26, wherein the generator is formed in an integrated circuit that is included in a smart card.

30. The generator of claim 20, wherein the phase generation circuit includes a slave circuit to generate first and second slave signals based upon an amplitude and a phase of the first and second pairs of signals.

31. The generator of claim 20, wherein the third and fourth signals are limited to a voltage level that is less than a gate oxide breakdown voltage of the output transistor of the charge pump.

32. A method of controlling a charge pump, comprising the steps of:

(A) generating first and second signals that are complementary to each other, non-overlapping, and switch between a reference voltage level of a reference voltage and a supply voltage level of a supply voltage;

(B) isolating and simultaneously charging each capacitor in a first network of capacitors to the supply voltage level when the first signal is at the reference voltage level;

(C) isolating and simultaneously charging each capacitor in a second network of capacitors to the supply voltage level when the second signal is at the reference voltage level;

(D) connecting each capacitor in the first network of capacitors in series between the supply voltage and an output node of the first network when the first signal is at the supply voltage level to generate a third signal, synchronized to the first signal, having a peak voltage level greater than the supply voltage level;

(E) connecting each capacitor in the second network of capacitors in series between the supply voltage and an output node of the second network when the second signal is at the supply voltage level to generate a fourth signal, synchronized to the fourth signal, having a peak voltage level greater than the supply voltage level; and (F) limiting the peak voltage levels of the third and fourth signals to be less than a gate oxide breakdown voltage of an output transistor of the charge pump.

33. The method of claim 32, wherein the peak voltage levels of the third and fourth signals are greater than a sum of a threshold voltage of the output transistor of the charge pump and a body effect of a drain voltage of the output transistor.

34. The method of claim 32, wherein step (A) includes a step of adjusting a frequency of the first and second signals in response to variations in the supply voltage level.

35. The method of claim 32, wherein step (B) includes a step of generating a first switching control signal having a voltage level that is approximately equal to the supply voltage level to isolate and simultaneously charge each capacitor in the first network.

36. The method of claim 35, wherein step (D) includes a step of generating a second switching control signal having a voltage level that is approximately twice the supply voltage level to connect each capacitor in the first network in series.

37. The method of claim 36, wherein the first switching control signal is opposite in phase to the second switching control signal and the voltage level of the second switching control signal is greater than the peak voltage level of the third signal.

38. The method of claim 32, wherein step (B) includes the steps of:

isolating an output of the first network of capacitors when the first signal is at the reference voltage level; and pulling the output of the first network of capacitors down to the reference voltage level when the first signal is at the reference voltage level.

39. A voltage generator comprising:

an oscillator to generate an oscillating clock signal;

a Schenkel type charge pump to supply an output voltage that is greater than a supply voltage level of a supply voltage;

a principal signal generator, coupled to the oscillator and the charge pump, to receive the oscillating clock signal, generate first and second signals that are complementary to each other, non-overlapping, and switch between a reference voltage level of a reference voltage and the supply voltage level, and provide the first and second signals to the charge pump;

a first network of capacitors and switching transistors coupled to the charge pump, to generate a third signal and provide the third signal to the charge pump, the third signal corresponding to the first signal and switching between the reference voltage level and a third voltage level that is greater than the supply voltage level when the first signal is at the supply voltage level;

a second network of capacitors and switching transistors coupled to the charge pump, to generate a fourth signal and provide the fourth signal to the charge pump, the fourth signal corresponding to the second signal and switching between the reference voltage level and the third voltage level when the second signal is at the supply voltage level; and secondary signal generation means, coupled to the principle signal generator and the first and second networks of capacitors and switching transistors, for generating first and second pairs of switching control signals to respectively generate the third and fourth signals.

40. The voltage generator of claim 39, further comprising:

a regulation circuit, coupled to the charge pump and the oscillator circuit, to receive the output voltage of the charge pump and reintroduce the output voltage to the oscillator circuit independent of variations in the supply voltage.

41. The voltage generator of claim 39, further comprising:

an enslavement circuit, coupled to the oscillator, to receive the first, second, third and fourth signals, and at least one switching control signal from each of the first and second pairs of switching control signals, and one of increase and decrease a frequency of the oscillating clock signal dependent on variations in the supply voltage level.

42. The voltage generator of claim 39, wherein the charge pump supplies the output voltage on an output transistor, and the secondary signal generation means includes:

means for limiting a peak amplitude of the third and fourth signals to a voltage level that is less than a gate oxide breakdown voltage of the output transistor.

43. The voltage generator of claim 39, wherein the secondary signal generation means includes:

a regulated voltage generator;

a first level translator, coupled to the regulated voltage generator and the principal signal generator, that generates the first pair of signals; and a second level translator, coupled to the regulated voltage generator and the principal signal generator, that generates the second pair of signals.

* * * * *